(12) United States Patent
Scholey et al.

(10) Patent No.: US 11,820,147 B2
(45) Date of Patent: Nov. 21, 2023

(54) INK REPLENISHING SYSTEM AND METHOD FOR CAN DECORATOR

(71) Applicant: Stolle Machinery Company, LLC, Centennial, CO (US)

(72) Inventors: Ian Kenneth Scholey, Lone Tree, CO (US); Joseph John Allen Maurer, Aurora, CO (US); Stephen Dane Christensen, Aurora, CO (US)

(73) Assignee: Stolle Machinery Company, LLC, Centennial, CO (US)

(*) Notice: Subject to any disclaimer, the term of this patent is extended or adjusted under 35 U.S.C. 154(b) by 169 days.

(21) Appl. No.: 17/538,377

(22) Filed: Nov. 30, 2021

(65) Prior Publication Data

US 2023/0166515 A1     Jun. 1, 2023

(51) Int. Cl.
*B41J 2/175*     (2006.01)
*B41J 3/407*     (2006.01)
*B25J 9/16*      (2006.01)
*B25J 15/00*     (2006.01)

(52) U.S. Cl.
CPC ......... *B41J 2/17509* (2013.01); *B25J 9/1679* (2013.01); *B25J 9/1694* (2013.01); *B25J 15/0019* (2013.01); *B41J 2/17566* (2013.01); *B41J 3/40733* (2020.08)

(58) Field of Classification Search
CPC .... B41J 2/175; B41J 2/17509; B41J 2/17566; B41J 3/40733; B41F 17/22; B41F 31/022; B41F 33/02; B25J 9/1679; B25J 9/1694; B25J 15/0019
See application file for complete search history.

(56) References Cited

U.S. PATENT DOCUMENTS

| 6,038,972 A | 3/2000 | Delwiche et al. |
| 2012/0272846 A1 | 11/2012 | Fleischer et al. |
| 2013/0123979 A1* | 5/2013 | Elliot ...................... B01L 9/523 |
| | | 700/245 |

FOREIGN PATENT DOCUMENTS

| EP | 3900893 A1 * | 10/2021 | ............. B25J 15/08 |
| GB | 2262068 A | 6/1993 | |

OTHER PUBLICATIONS

U.S. Patent and Trademark Office, PCT/US22/80528 International Search Report and Written Opinion, dated Mar. 6, 2023, 13 pages.

* cited by examiner

*Primary Examiner* — Anh T Vo
(74) *Attorney, Agent, or Firm* — Eckert Seamans Cherin & Mellott, LLC

(57) ABSTRACT

An ink replenishment system for a can decorator having a plurality of ink fountains corresponding to a plurality of ink station assemblies includes a robotic arm structured to pick up ink from a selected one of a plurality of ink container and to place the picked up ink into a selected one of the plurality of ink fountains, and a controller structured to control operations of the robotic arm.

20 Claims, 12 Drawing Sheets

INK REPLENISHING SYSTEM AND METHOD FOR CAN DECORATOR

FIELD OF THE INVENTION

The disclosed concept relates generally to can decorators and, more particularly, to an ink replenishing system and method for can decorators.

BACKGROUND OF THE INVENTION

High speed continuous motion machines for decorating cans, commonly referred to as "can decorator machines" or simply "can decorators," are generally well known. Typically, via multiple ink stations, the can decorator decorates cans by applying various colors of ink to the cans to create images to the cans. The ink stations each include a reservoir, referred to as an ink fountain, to store ink that will be applied to cans.

Various colors of ink are typically loaded manually into corresponding ink fountains. However, the ink fountains can be difficult to access and coming into close proximity to an operating can decorator can be unsafe for an operator. It is also time consuming for an operator to manually fill the ink fountains. Additionally, after a particular run of cans has been decorated, the can decorator may need to be reconfigured for a run of cans that uses a different image. For example, the colors and amounts of ink used by each ink station may change for the new amount of cans. Cleaning leftover ink from ink fountains from the previous run of cans can add to the reconfiguration time of the can decorator and result in additional downtime for the can decorator.

The time and safety issues associated with manually refilling ink fountains are a problem. There is, therefore, room for improvement in can decorating machines and systems for replenishing ink in can decorator machines.

SUMMARY OF THE INVENTION

In accordance with an aspect of the disclosed concept, an ink replenishment system for a can decorator having a plurality of ink fountains corresponding to a plurality of ink station assemblies comprises: a robotic arm structured to move between the plurality of ink fountains and a plurality of ink containers, to pick up ink from one of the plurality of ink fountains or ink containers and to place the picked up ink in another one of the plurality of ink fountains or ink containers; and a controller structured to control operations of the robotic arm.

In accordance with an aspect of the disclosed concept, a method for replenishing ink in a can decorator having a plurality of ink fountains corresponding to a plurality of ink station assemblies comprises: controlling a robotic arm to pick up ink from one of the plurality of ink fountains or one of a plurality of ink containers, wherein the robotic arm structured to move between the plurality of ink fountains ink containers; controlling the robotic arm to move to another one of the plurality of ink fountains or ink containers; and controlling the robotic arm to place the picked up ink in the another one of the plurality of ink fountains or ink containers.

In accordance with an aspect of the disclosed concept, a can decorator system comprises: a plurality of ink fountains corresponding to a plurality of ink station assemblies; a plurality of ink containers; a robotic arm structured to move between the plurality of ink fountains and the plurality of ink containers, to pick up ink from one of the plurality of ink fountains or ink containers and to place the picked up ink in another one of the plurality of ink fountains or ink containers; and a controller structured to control operations of the robotic arm.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
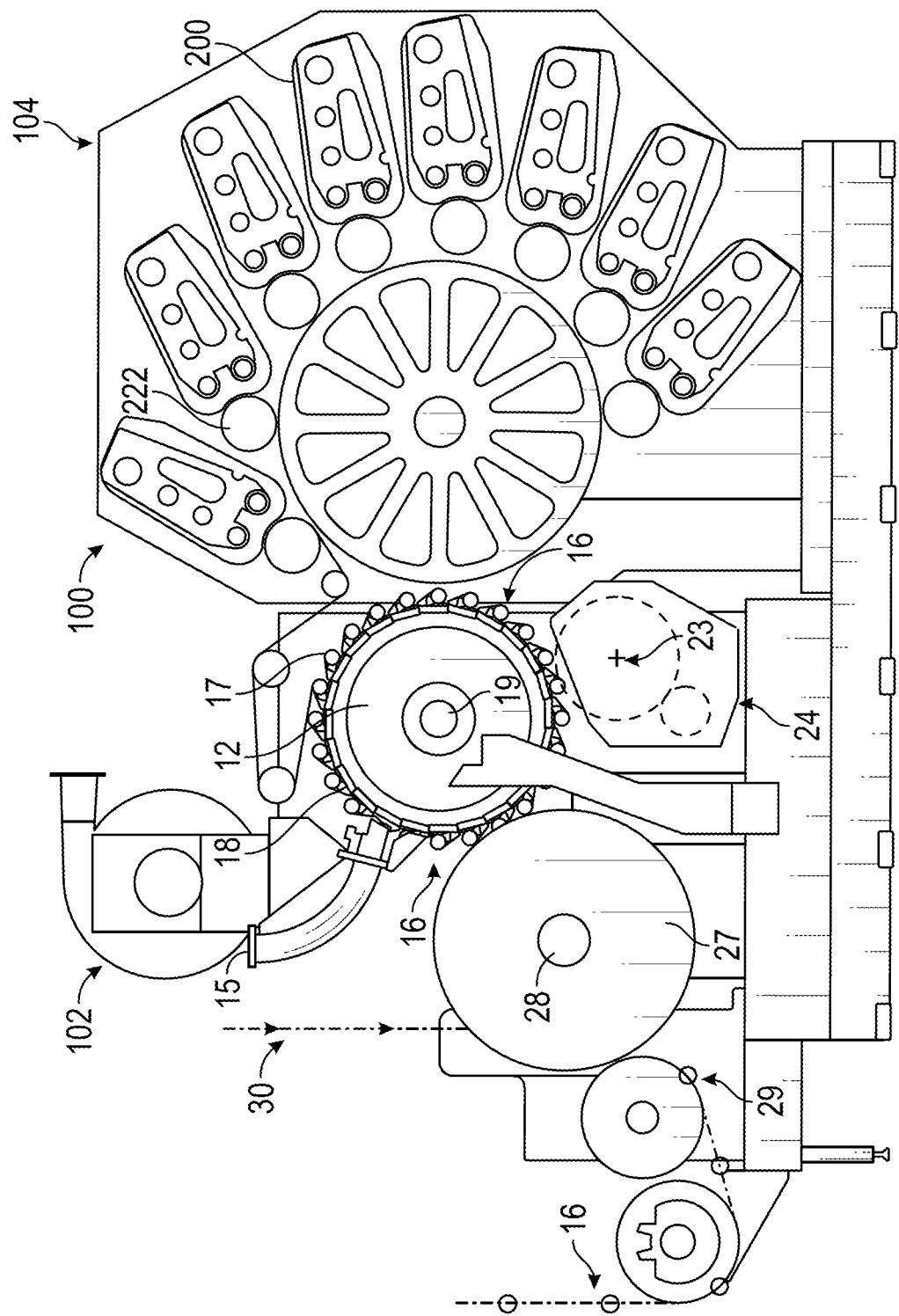
FIG. 1 is side elevation view of a can decorator machine in accordance with an example embodiment of the disclosed concept.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

FIG. 1 shows a can decorator 100. As shown in FIG. 1, the can decorator 100 includes a can transport assembly 102 that includes an infeed conveyor 15, which receives cans 16 from a can supply (not shown) and directs them to arcuate cradles or pockets 17 along the periphery of spaced parallel rings secured to a pocket wheel 12. The pocket wheel 12 is fixedly secured to a continuously rotating mandrel carrier wheel 18, which in turn is keyed to a continuously rotating horizontal drive shaft 19. Horizontal spindles or mandrels (not shown), each being pivotable about its own axis, are mounted to the mandrel carrier wheel 18 adjacent its periphery. Downstream from the infeed conveyor 15, each spindle or mandrel is in closely spaced axial alignment with an individual pocket 17, and undecorated cans 16 are transferred from the pockets 17 to the mandrels. Suction applied through an axial passage of the mandrel draws the can 16 to a final seated position on the mandrel.

While mounted on a mandrel, each can 16 is decorated by being brought into engagement with a blanket (e.g., without limitation, a replaceable adhesive-backed piece of rubber) disposed on a blanket wheel of an ink application assembly 104. Thereafter, and while still mounted on the mandrels, the outside of each decorated can 16 is coated with a protective film of varnish applied by engagement with the periphery of a varnish applicator roll (not shown) rotating on a shaft 23 in the overvarnish unit indicated generally by reference numeral 24. Cans 16 with decorations and protective coatings thereon are then transferred from the mandrels to suction cups (not shown) mounted adjacent the periphery of a transfer wheel (not shown) rotating on a shaft 28 of a transfer unit 27. From the transfer unit 27 the cans 16 are deposited on generally horizontal pins 29 carried by a chain-type output conveyor 30, which carries the cans 16 through a curing oven (not shown).

While moving toward engagement with an undecorated can 16, the blanket engages a plurality of printing cylinders 222, each of which is associated with an individual ink station assembly 200 (an exemplary eight ink station assemblies 200 are shown in FIG. 1). Typically, each ink station assembly 200 provides a different color ink and each printing cylinder 222 applies a different ink image segment to the blanket. All of the "ink image" segments combine to produce a "main image" that is structured to be applied to the can body. The "main image" is then transferred to undecorated cans 16 and becomes, as used herein, the "can body applied image."

Each ink station assembly 200 includes a plurality of rollers, or as used herein, "rolls," that are structured to transfer a quantity of ink from a reservoir, or as used herein an "ink fountain," to the blanket. The path that the ink travels is, as used herein, identified as the "ink train." That is, the rolls over which the ink travels define the "ink train." Further, as used herein, the "ink train" has a direction with the ink fountain being at the "upstream" end of the ink train and a printing cylinder 222 at the "downstream" end of the ink train.

The ink train extends over a number of rolls each of which has a purpose. As shown, the ink train starts at the ink fountain and is initially applied as a film to a fountain roll. The fountain roll is intermittently engaged by a ductor roll. When the ductor roll engages the fountain roll, a quantity of ink is transferred to the ductor roll. The ductor roll also intermittently engages a downstream roll and transfers ink thereto. The ductor roll has a "duty cycle" which, as used herein, means the ratio of the duration of the ductor roller being in contact with the fountain roller divided by the duration of a complete cycle (ductor roller in contact with the fountain roller, move to the first downstream roller, contact with first steel roller, move back to fountain roller).

The other rolls include, but are not limited to, distribution roll(s), oscillator roll(s), and transfer roll(s). Generally, these rolls are structured to distribute the ink so that a proper amount of ink is generally evenly applied to the printing cylinder 222. For example, the oscillator rolls are structured to reciprocate longitudinally about their axis of rotation so as to spread the ink as it is applied to the next downstream roll. The final roll is the printing cylinder 222 which applies the ink to the blanket. It is understood that each ink station assembly 200 applies an "ink image" of a single selected color to the blanket and that each ink station assembly 200 must apply its ink image in a proper position relative to the other ink images so that the main image does not have offset ink images.

Thus, as used herein, an "ink image" means the image of a single ink color which is part of a "main image." As used herein, a "main image" means an image created from a number of ink images and which is the image that is applied to a can body as the "can body applied image." It is understood that a "main image" includes a number, and typically a plurality, of ink images. For example, if the main image was the French flag (which is a tricolor flag featuring three vertical bands colored blue (hoist side), white, and red), an ink station assembly 200 with blue ink would provide an ink image that is a blue rectangle, an ink station assembly 200 with white ink would provide an ink image that is a white rectangle and an ink station assembly 200 with red ink would provide an ink image that is a red rectangle. Further, presuming that the main image was of a French flag with the hoist side on the left, the ink station assembly 200 with blue ink would provide the blue rectangle ink image on the left side of the blanket, the ink station assembly 200 with white ink would provide the white rectangle ink image on the center of the blanket immediately adjacent the blue rectangle ink image, and the ink station assembly 200 with red ink would provide the red rectangle ink image on the right side of the blanket immediately adjacent the white rectangle ink image. Once all the ink images are applied to the blanket, the main image is formed and then applied to a can body.

Each ink station assembly 200 is structured so that the final roll(s) before the printing cylinder 222 apply a proper amount of ink to the printing cylinder 222. Those of skill in the art know the amount of ink required so as to produce an image with an intended clarity, resolution and hue. Thus, as would be understood by those of skill in the art, and as used herein, the "proper" amount of ink is an amount that is neither too little (which typically results in a faint image) nor too much (which typically results in a blurred image), i.e., a "proper" amount of ink is an amount of ink that results in the image being produced with the intended clarity, resolution and hue. Further, the "proper" amount of ink applied to a printing cylinder 222 is also a film with a substantially consistent thickness. It is understood that those of skill in the art know the amount of ink to be applied to a substrate such as, but not limited to a can body, that is required to produce an image with the intended clarity, resolution and hue.

Figure 2:
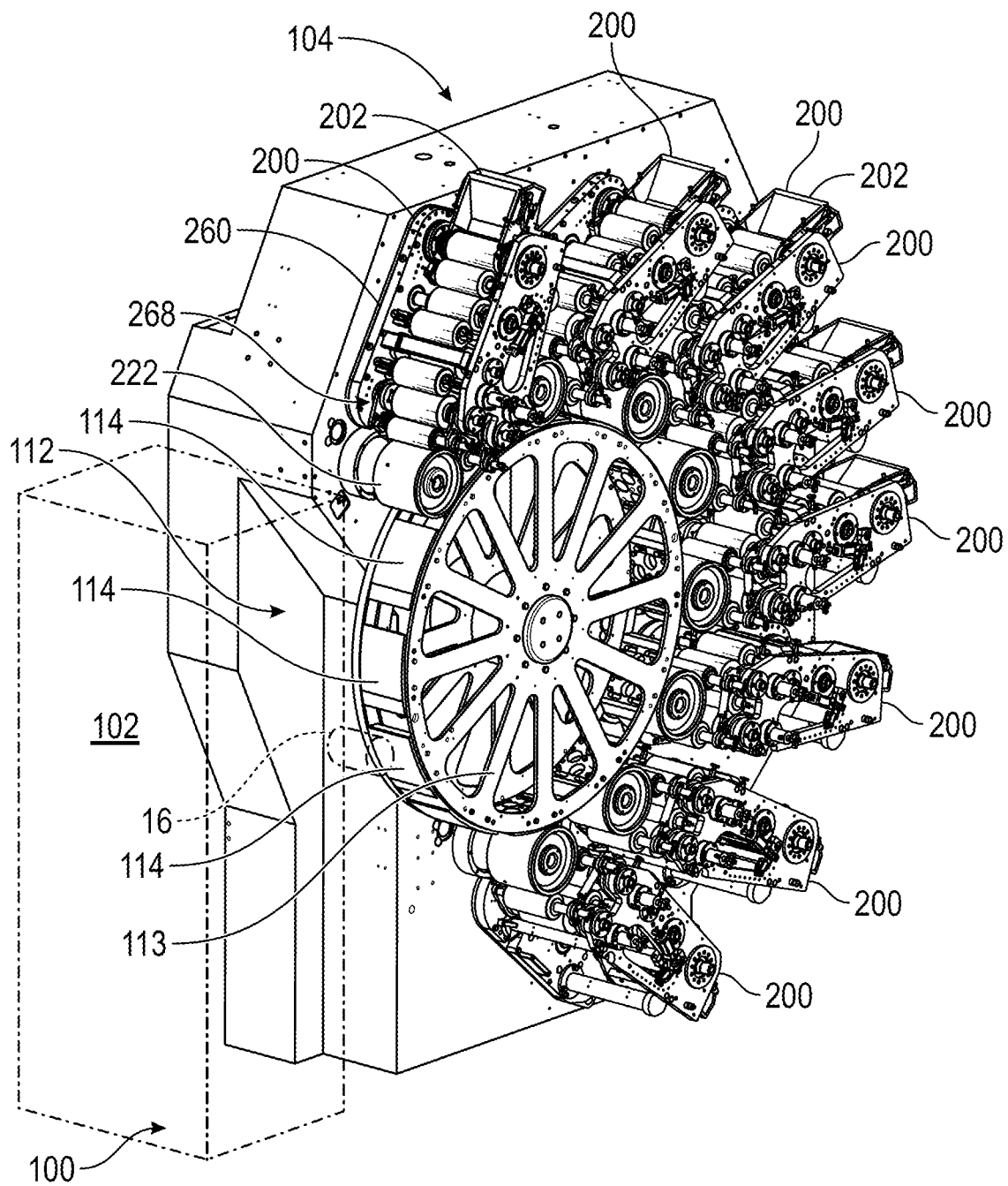
FIG. 2 is an isometric view of a portion of a can decorator machine and ink station assembly therefor in accordance with an example embodiment of the disclosed concept.

FIG. 2 is an isometric view of a portion of the can decorator machine 100 and ink station assemblies 200 in accordance with an example embodiment of the disclosed concept, and in particular, shows ink station assemblies 200 in accordance with an example embodiment of the disclosed concept in more detail. As shown in FIG. 2, the can decorator machine 100 includes the can transport assembly 102 (shown schematically) and the ink application system 104. The can transport assembly 102 is substantially similar to the can transport construct described above with respect to FIG. 1, the description of which is incorporated herein. Generally, the can transport assembly 102 is structured to, and does, move a number of undecorated can bodies 16 into contact with the ink application system 104 and, as shown, a blanket wheel 112 and/or an image transfer segment 114, as discussed below.

The ink application system 104 is structured to, and does, apply ink in a selected pattern to the exterior of each can body 300. That is, the ink application system 104 includes a plurality of ink station assemblies 200 (eight are shown)

and a blanket wheel 112. The blanket wheel 112 is an assembly that includes a wheel frame 113 (i.e., a frame forming a generally disk-like body) with a plurality of image transfer segments 114 (shown in phantom line drawing in FIG. 4) disposed on the radial surface thereof. Preferably, the blanket wheel 112 is structured to transfer a main image (that includes a plurality of combined "ink images") from each image transfer segment 114 to a corresponding one of the can bodies 16.

As previously noted, the can decorator 100 further includes a plurality of ink station assemblies 200. It will be appreciated that, while the can decorator 100 in the example shown and described herein includes eight ink station assemblies 200, that it could alternatively contain any known or suitable alternative number and/or configuration of ink station assemblies (not shown), without departing from the scope of the disclosed concept. It will further be appreciated that, for economy of disclosure and simplicity of illustration, only one of the ink station assemblies 200 will be shown and described in detail herein.

Figure 3:
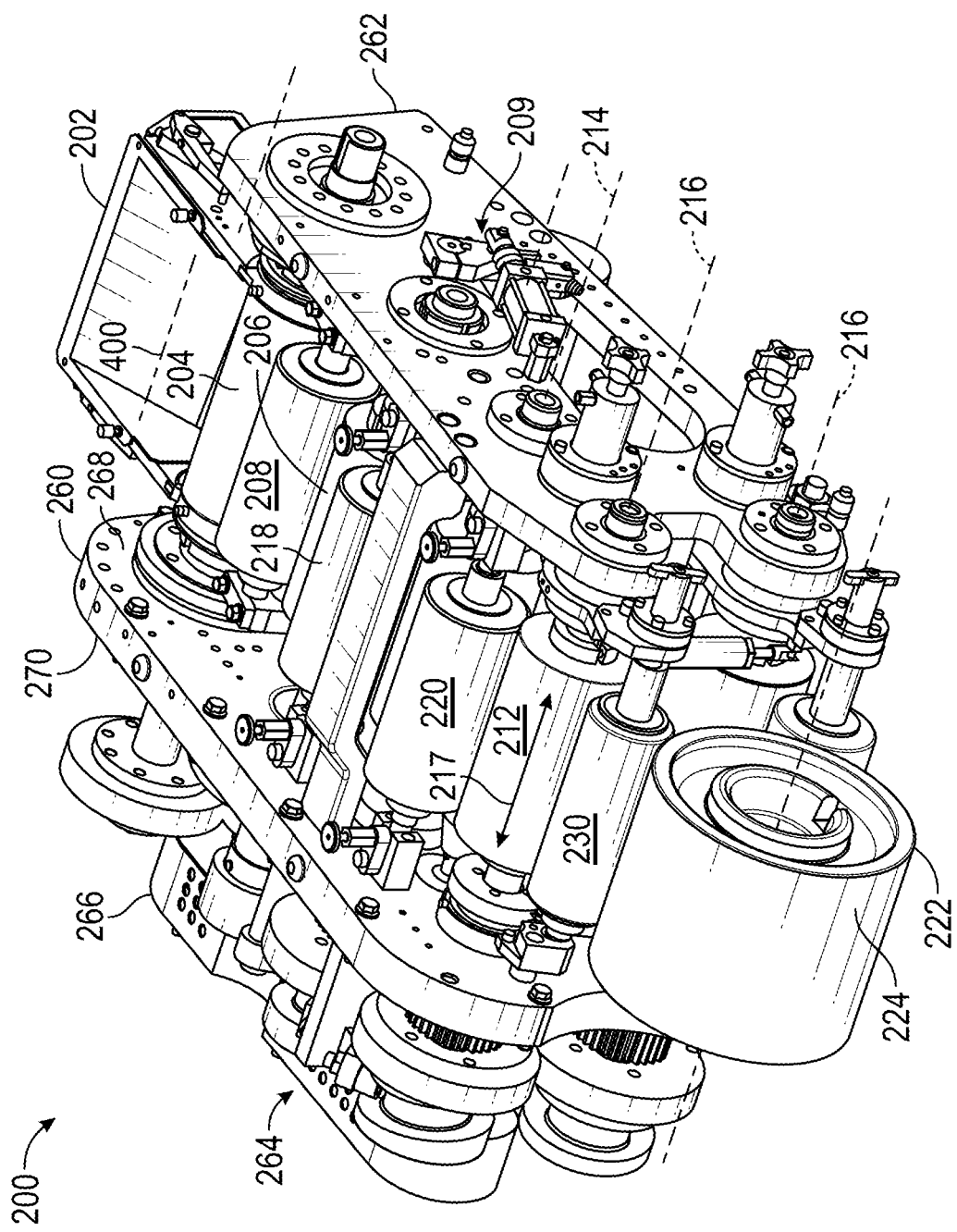
FIG. 3 is a partially schematic isometric view of one of the ink station assemblies of FIG. 2.
Figure 4:
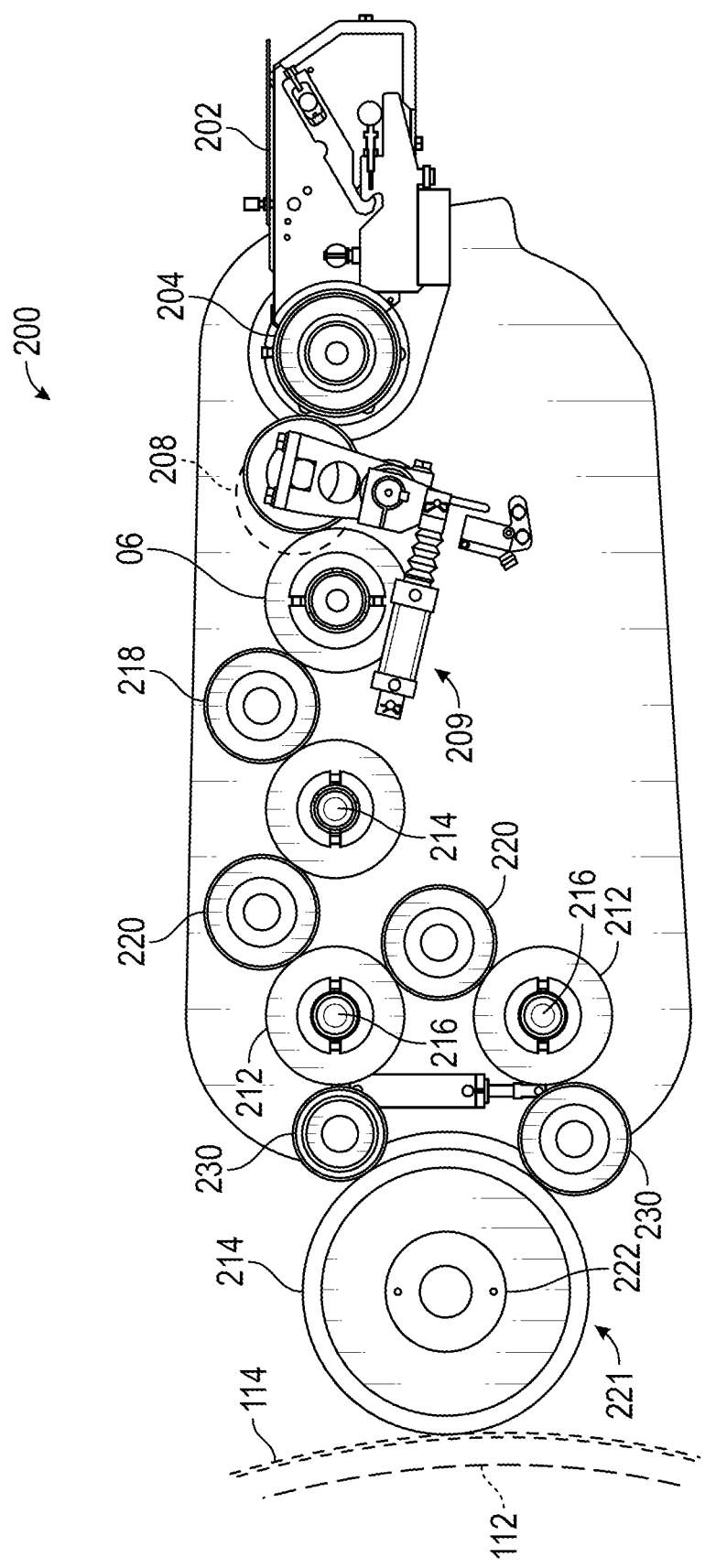
FIG. 4 is a side elevation view of the ink station assembly of FIG. 3 with one of the side plates removed.

FIGS. 3 and 4 show one non-limiting example embodiment of the ink station assembly 200 in greater detail. Specifically, the ink station assembly 200 includes an ink fountain 202 structured to provide a supply of ink 400 (shown in phantom line drawing in simplified form in FIG. 3; see also FIG. 5). A fountain roll 204 receives the ink 400 from the ink fountain 202. The ink station assembly 200 further includes a distributor roll 206 and a ductor roll 208 that is co-operable with both the fountain roll 204 and the distributor roll 206 to transfer the ink 400 from the fountain roll 204 to the distributor roll 206. That is, the ductor roll 208 is part of a ductor roll assembly that further includes a duty cycle adjustment assembly 209 that is structured to, and does, cause the ductor roll 208 to reciprocate between two positions; a first position wherein the ductor roll 208 engages the fountain roll 204 thereby causing ink to transfer from the fountain roll 204 to the ductor roll 208 and wherein the ductor roll 208 is spaced from the distributor roll 206, and, a second position, wherein the ductor roll 208 is spaced from the fountain roll 204 and wherein the ductor roll 208 engages the distributor roll 206 thereby causing ink to transfer from the ductor roll 208 to the distributor roll 206. The duty cycle adjustment assembly 209 is structured to, and does, alter the duty cycle of the ductor roll 208 (see adjusted position of ductor roll 208 shown in phantom line drawing in FIG. 4). That is, the duty cycle adjustment assembly 209 is structured to, and does, alter the length of time the ductor roll 208 engages the fountain roll 204.

Further, a number of oscillator rolls 210, 212 (two are shown) each have a longitudinal axis 214, 216, respectively. The oscillator rolls 210, 212 are structured to, and do, oscillate back and forth along their longitudinal axes 214, 216. By way of example, and without limitation, oscillator roll 212 oscillates back and forth along axis 216 in the directions generally indicated by arrow 217. Oscillator roll 210 oscillates back and forth along longitudinal axis 214 in a similar manner.

The example ink station assembly 200 also includes two transfer rolls 218, 220, each of which cooperates with at least one of the oscillator rolls 210, 212. It will be appreciated, however, that any known or suitable alternative number and/or configuration of transfer rolls (not shown) other than that which is shown and described herein, could be employed without departing from the scope of the disclosed concept.

Figure 5:
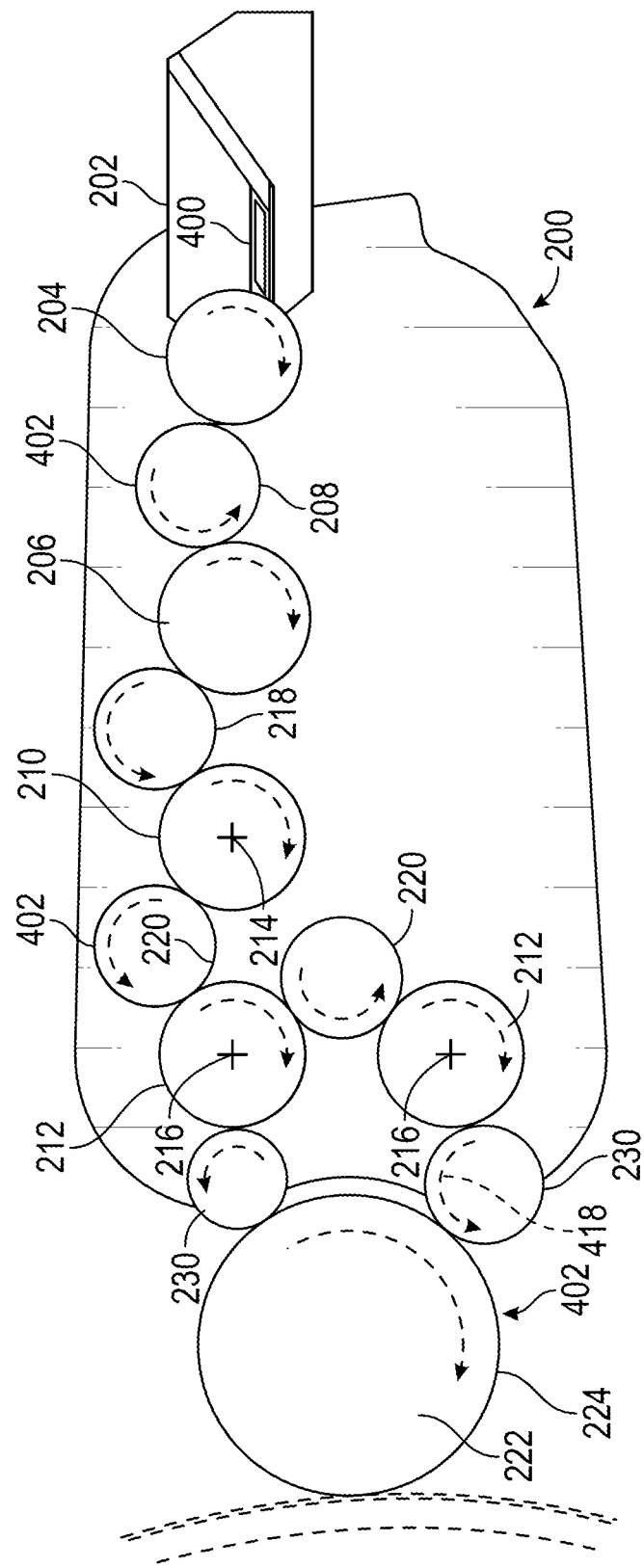
FIG. 5 is a schematic side view of an ink station assembly showing the ink train.

A printing plate cylinder assembly includes a printing plate cylinder 222 having a printing plate (generally indicated by reference number 224). The printing plate cylinder 222 cooperates with a number of form rolls 230 to apply the ink 400 to the printing plate 224. As noted above, the printing plate cylinder 222 engages a blanket wheel 112 and/or an image transfer segment 114. The blanket wheel 112 (FIGS. 2 and 4) and/or an image transfer segment 114 (FIGS. 2 and 4) engages a can body 300 (FIG. 2) thereby transferring the ink to the can body 300 (shown in simplified form in phantom line drawing in FIG. 2). Thus, generally, each ink station assembly 200 defines an "ink train 402," as shown in FIG. 5, whereby ink 400 is transferred from the fountain roll 204 to the form roll 230 as described above. Moreover, one broad purpose of the various rolls discussed above is to spread the ink so as to form a thin ink film and disperse the ink so that the ink film has a substantially uniform thickness when applied to the printing plate 224. That is, the ink 400 on the various rolls, e.g., distributor roll 206, is in the form of a film that is sequentially thinned and evenly distributed over the surface of the rolls.

As best shown in FIG. 3, the ink station assembly 200 further includes first and second opposing side plates 260, 262, a drive assembly 264, and a housing 266 at least partially enclosing the drive assembly 264. The first side plate 260 has first and second opposing sides 268, 270. The fountain roll 204, the distributor roll 206, the ductor roll 208, the oscillator rolls 210, 212, the transfer rolls 218, 220, and the single form roll 230 are all rotatably disposed between the first side plate 260 and the second side plate 262. The drive assembly 264 is disposed on the second side 270 of the first side plate 260, and is structured to drive at least the fountain roll 204, distributor roll 206, and oscillator rolls 210, 212, in a generally well known manner.

Figure 6A:
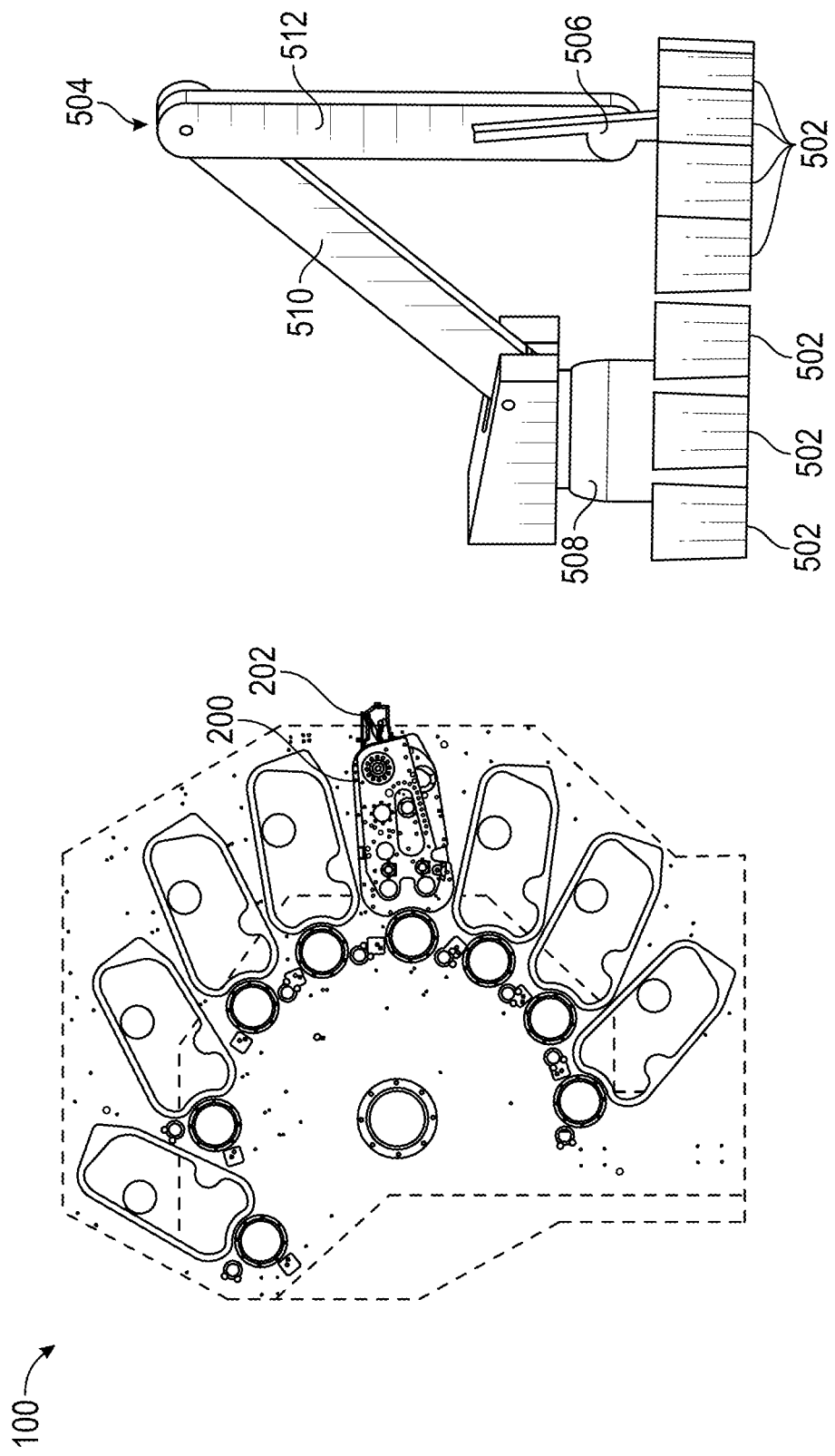
FIGS. 6A-C are side elevation views of ink station assemblies of a can decorator and an ink replenishment system in various stages of operation in accordance with an example embodiment of the disclosed concept.
Figure 6B:
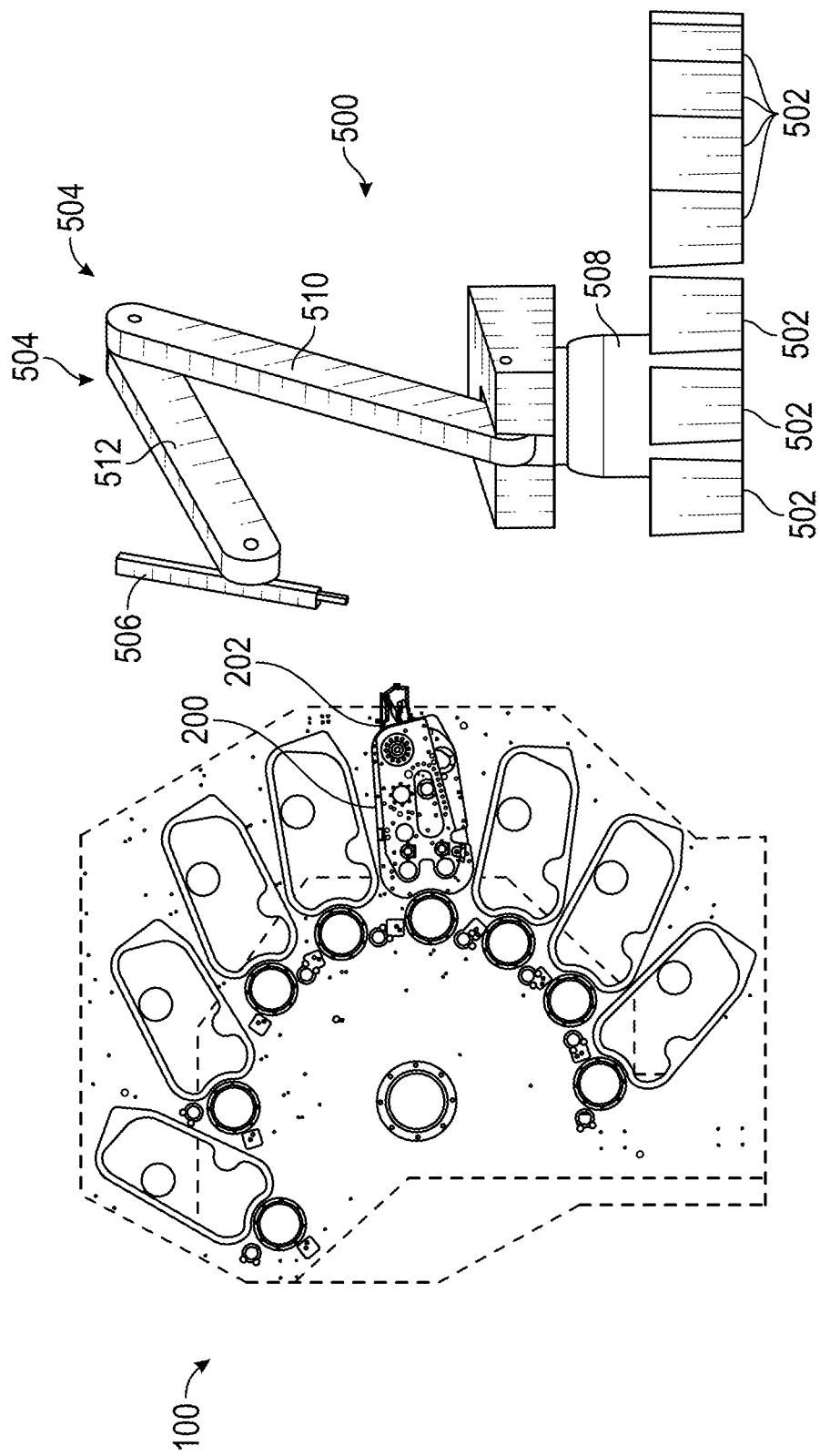
Figure 6C:
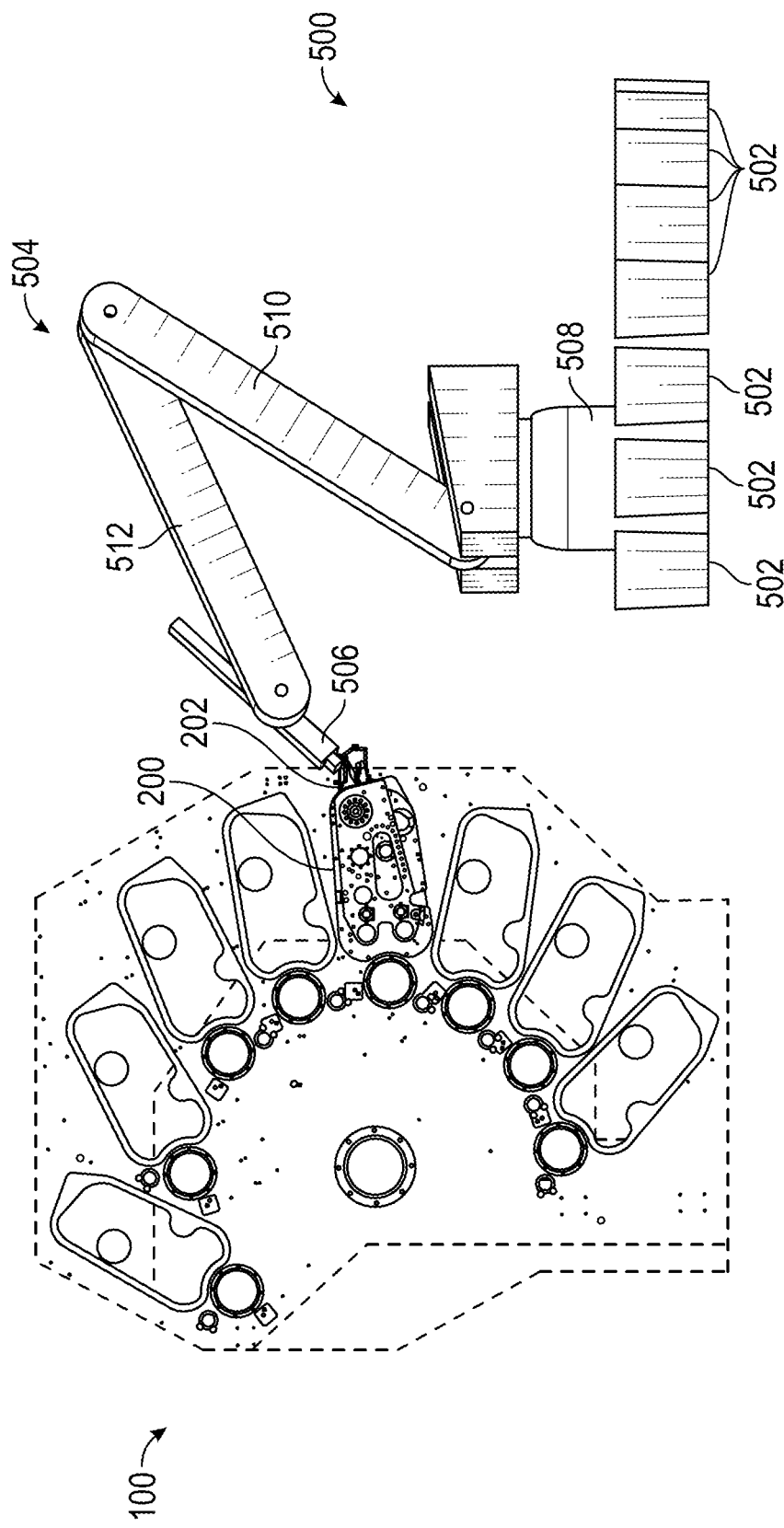

FIGS. 6A-C are side elevation views of ink station assemblies 200 of a can decorator 100 and an ink replenishment system 500 in various stages of operation in accordance with an example embodiment of the disclosed concept. The ink replenishment system 500 includes a number ink containers 502 and a robotic arm 504. The ink containers 502 each contain ink for use in the can decorator 100. For example, each ink container 502 may contain one color of ink, but it will be appreciated that multiple ink containers 502 may contain the same color of ink. The robotic arm 504 is structured to pick up ink from a selected ink container 502 and deposit the ink in an ink fountain 202 of a selected ink station assembly 200. For example, when an ink fountain 202 runs low on ink, the robotic arm 504 may pick up ink from an ink container 502 holding an ink color corresponding to the ink fountain 202 and place the ink in the ink fountain 202 to replenish the ink in the ink fountain 202. In some example embodiments, replenishment may be initiated automatically based on sensor feedback, but it will be appreciated that in some example embodiments replenishment may be initiated manually by an operator.

In some example embodiments, the robotic arm 504 may also be structured to pick up ink from the ink fountain 202 of a selected ink station assembly 200 and place it in a selected ink container 502. For example, after a run of cans, the robotic arm 504 may pick up any remaining ink in the ink fountain 202 and place it in the selected ink container 502 in order to save the ink for later use and to reduce the cleaning and reconfiguration time of the can decorator 100.

The robotic arm 504 includes a nozzle assembly 506, a base 508, a first arm 510, and a second arm 512. The nozzle assembly 506 includes a nozzle and a reservoir. Ink may be picked up from the ink container 502 or ink fountain 202 via the nozzle and stored in the reservoir. Similarly, ink stored in the reservoir may be placed in the ink fountain 202 or ink container 502 via the nozzle.

The base 508 of the robotic arm 504 is attached to the first arm 510 and is structured to rotate. The first arm 510 is pivotally attached at one end to the base 508 and is pivotally attached at an opposite end to the second arm 512. The second arm 512 is pivotally attached at one end to the first arm 510 and the nozzle assembly 506 is pivotally attached at an opposite end of the second arm 512. The robotic arm 504 may include motor, servos, or other mechanisms to facilitate rotation of the base 508 and pivoting of the first and second arms 510,512 and the nozzle assembly 506. With the rotational and pivotal movement of the various components of the robotic arm 504, the robotic arm 504 may selectively position the nozzle assembly 506 in any of the ink containers 502 and any of the ink fountains 202 of the can decorator 100. While only one of the ink station assemblies 200 and ink fountains 202 is shown in detail in FIGS. 6A-C, it will be appreciated that the robotic arm 504 may position the nozzle assembly 506 in any of the ink fountains 202. The robotic arm 504 may also include a pumping mechanism to facilitate picking up and placing ink with the nozzle assembly 506.

FIGS. 6A-C illustrate an operation of moving ink from a selected ink container 502 to a selected ink fountain 202. In FIG. 6A, the nozzle assembly 506 is positioned in the selected ink container 506 by the robotic arm 504. In this position, the nozzle assembly 506 is operated to pick up ink and store it in the reservoir of the nozzle assembly 506. Once the ink has been picked up, the robotic arm 504 begins movement to the selected ink fountain 202. FIG. 6B shows the robotic arm 504 in the process of movement to the selected ink fountain 202. For example, pivotal movement of the first and second arms 510,512 lifts the nozzle assembly 506 out of the ink container 502, and rotational movement of the base 508 moves the nozzle assembly 506 toward the selected ink fountain 202. From the position shown in FIG. 6B, the robotic arm 504 continues rotational and pivotal movement to place the nozzle assembly 506 in the selected ink fountain 202. As shown in FIG. 6C, the nozzle assembly 506 is positioned in the selected ink fountain 202. From this position, the nozzle assembly 506 may be operated to place the ink stored in its reservoir, which was recently picked up from the ink container 502, into the selected ink fountain 202.

While the operation of picking up ink from one ink container 502 and placing it in one ink fountain 202 is illustrated in FIGS. 6A-C, it will be appreciated that the robotic arm 504 is structured to pick up ink from any of the ink containers 502 and place ink into any of the ink fountains 202. In some example embodiments, the robotic arm 504 is structured to pick up ink from any of the ink fountains 202 and place ink in any of the ink containers 502.

Figure 7A:
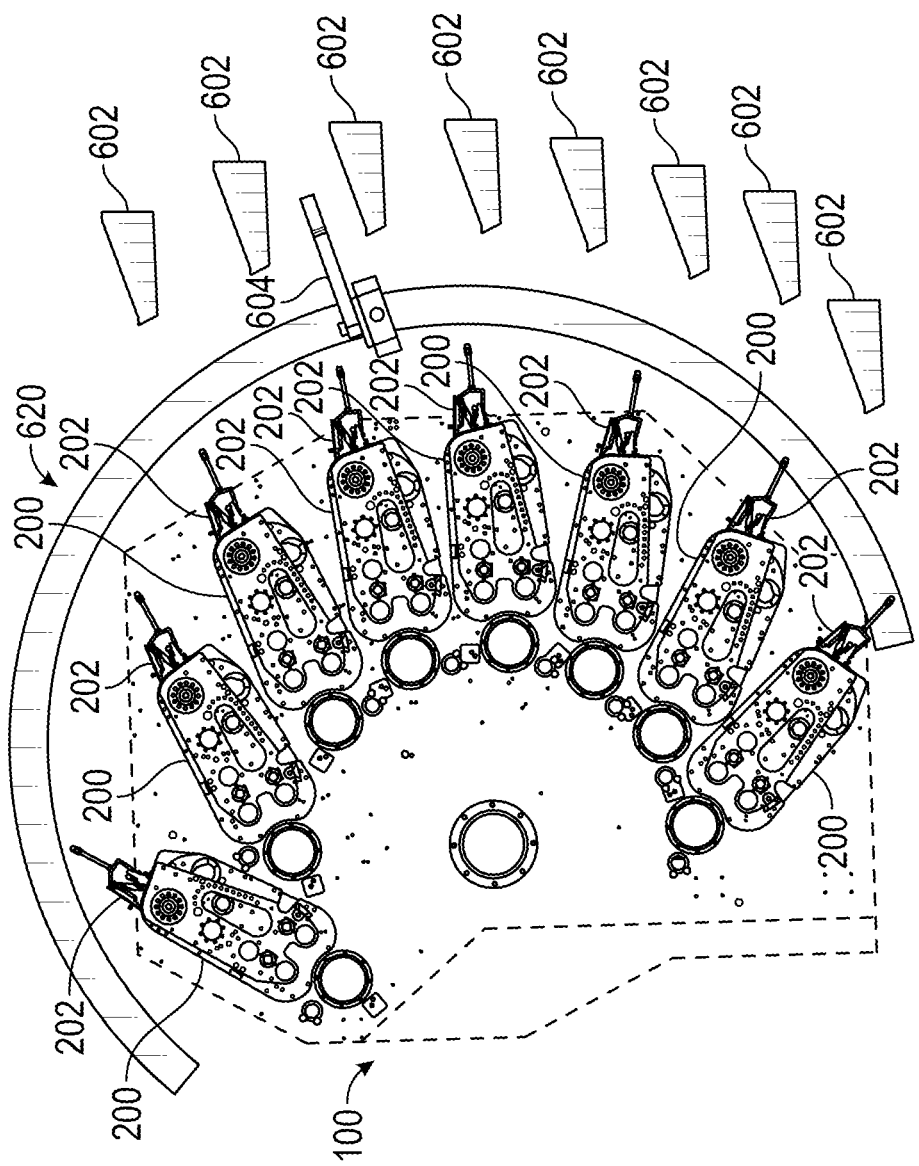
FIGS. 7A-C are side elevation views of ink station assemblies of a can decorator and an ink replenishment system in various stages of operation in accordance with another example embodiment of the disclosed concept.
Figure 7B:
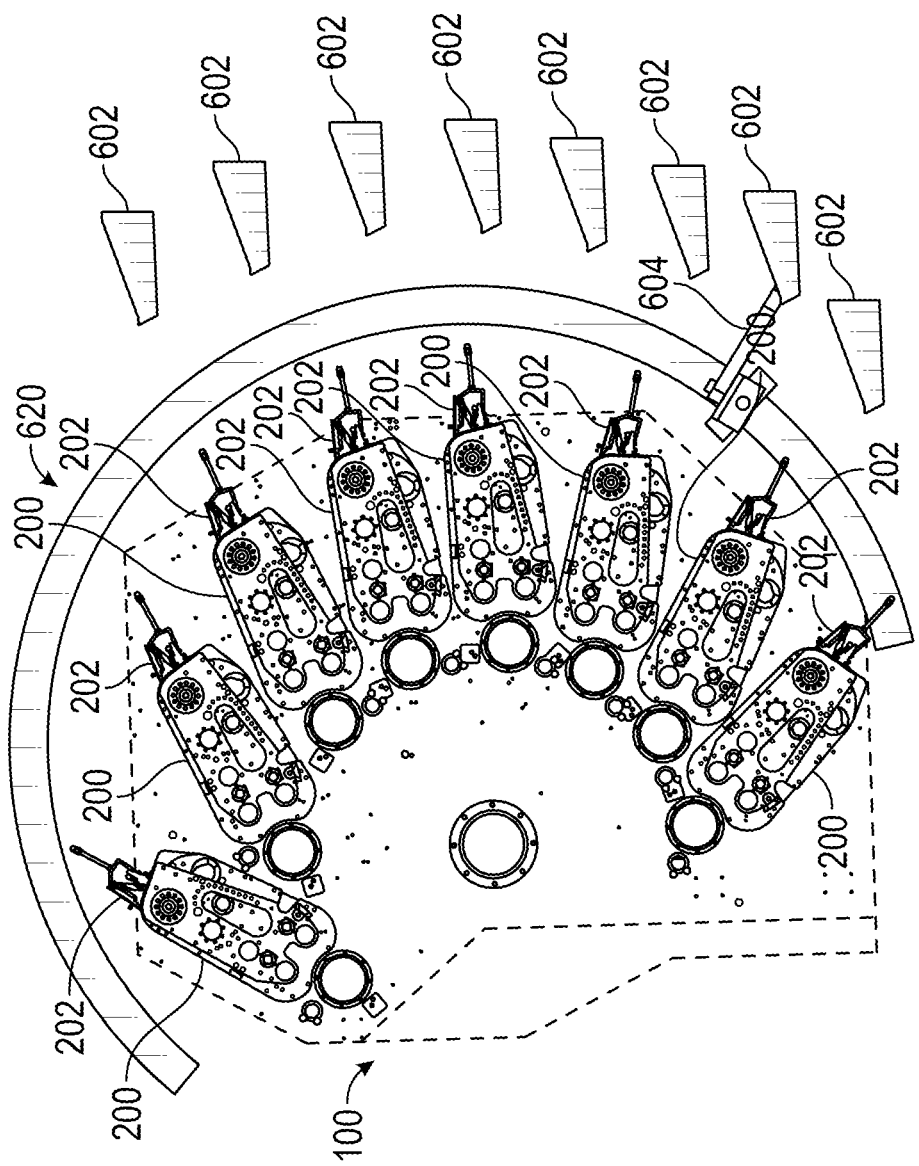
Figure 7C:
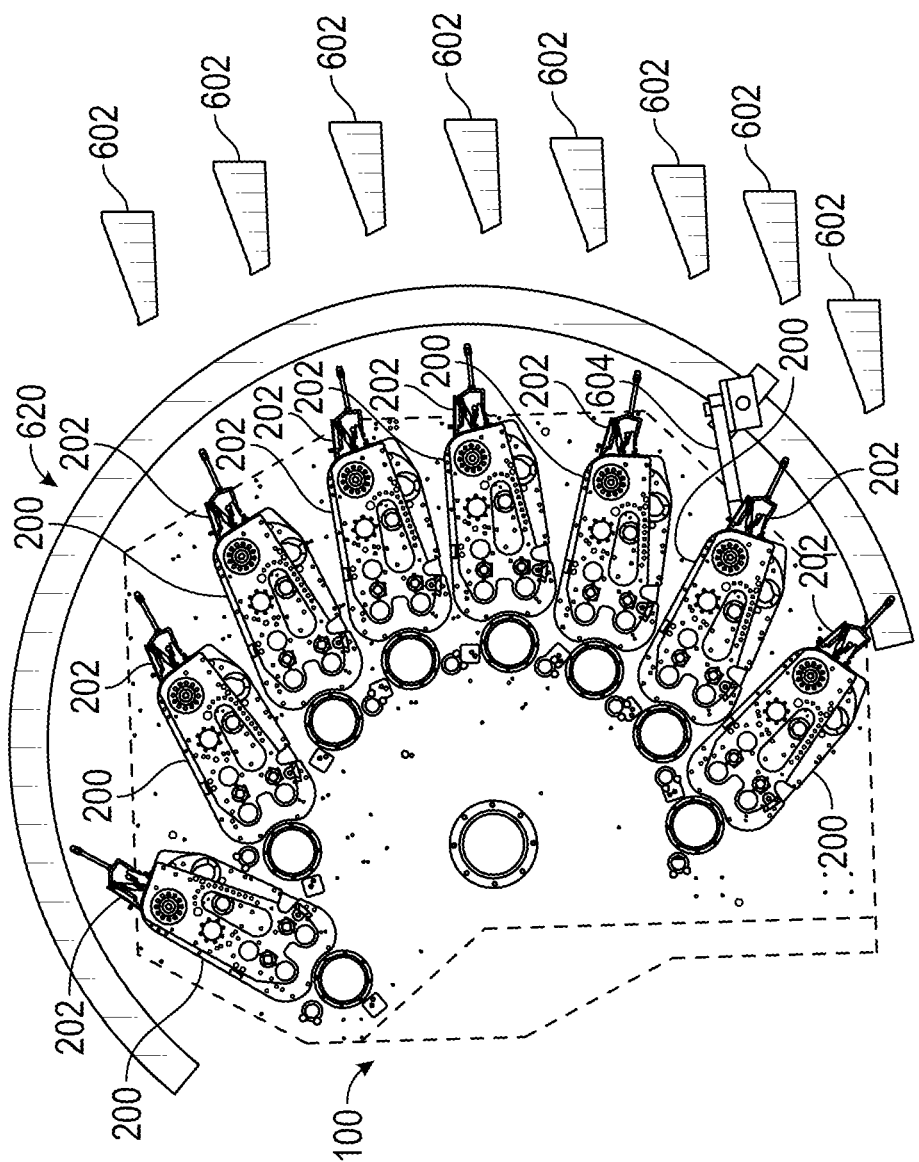

FIGS. 7A-C are side elevation views of ink station assemblies 200 of a can decorator 100 and an ink replenishment system 600 in various stages of operation in accordance with another example embodiment of the disclosed concept. The ink replenishment system 600 includes a number ink containers 602 and a robotic arm 604 movable along a track 620. The ink containers 602 each contain ink for use in the can decorator 100. For example, each ink container 602 may contain one color of ink. The robotic arm 604 is structured to move along the track 620 to a position proximate a selected ink container 602 and pick up ink from the selected ink container 602. The robotic arm 604 the moves along the track 620 to a selected ink fountain 202 and deposits the ink in the selected ink fountain 202. For example, when an ink fountain 202 runs low on ink, the robotic arm 604 may pick up ink from an ink container 602 holding an ink color corresponding to the ink fountain 202 and place the ink in the ink fountain 202 to replenish the ink in the ink fountain 202. In some example embodiments, replenishment may be initiated automatically based on sensor feedback, but it will be appreciated that in some example embodiments replenishment may be initiated manually by an operator.

In some example embodiments, the robotic arm 604 may also be structured to pick up ink from the ink fountain 202 of a selected ink station assembly 200 and place it in a selected ink container 602. For example, after a run of cans, the robotic arm 604 may pick up any remaining ink in the ink fountain 202 and place it in the selected ink container 602 in order to save the ink for later use and to reduce the cleaning and reconfiguration time of the can decorator 100.

The robotic arm 604 includes a nozzle assembly including a nozzle and a reservoir. The robotic arm 604 is structured to pick up ink via the nozzle and store it in the reservoir. The robotic arm 604 may then place the ink stored in the reservoir in a selected ink fountain 202 or ink container 602. The nozzle assembly may be rotatable and/or pivotable about a base of the robotic arm 604 in order to position in the nozzle in a selected ink container 602 or ink fountain 202. The base of the robotic arm 604 may be coupled to the track 620 such that the robotic arm 604 may move along the track 620. In the example embodiment shown in FIGS. 7A-C, the track 620 has an arced shape corresponding to the arced arrangement of the ink fountains 202. The ink containers 602 may also have an arced arrangement corresponding to the arced shape of the track 620. While in this example embodiment, the ink containers 602 and the track 620 have corresponding arced shapes, it will be appreciated that ink containers and a track having other corresponding shapes may be employed without departing from the scope of the disclosed concept. For example, for ink containers having a rectangular grid arrangement, a track having a corresponding rectangular shape may be employed. The robotic arm 604 may have various motors and/or servos or other mechanisms to facilitate rotation and/or pivoting of the nozzle assembly and movement of the robotic arm 604 along the track 620. The robotic arm 604 may also include a pumping mechanism to facilitate picking up ink and placing ink in the ink fountains 202 or ink containers 602.

FIGS. 7A-C illustrate the robotic arm 604 in various stages of an operation of picking up ink from a selected ink container 602 and placing the ink in a selected ink fountain 202. In FIG. 7A, the robotic arm 604 is in a transitional state where it is neither picking up or placing ink. When the robotic arm 604 is controlled to pick up ink from a selected ink container 602, the robotic arm 604 moves along the track 620 to a position proximate the selected ink container 602 and the nozzle assembly is rotated and/or pivoted such that it is placed in the selected ink container 602. FIG. 7B shows the robotic arm 604 with the nozzle assembly placed in the selected ink container 602. From this position, the nozzle assembly is operated to pick up ink from the ink container 602 and store it in the reservoir of the nozzle assembly. Once the robotic arm 604 has picked up ink from the ink container 602, the robotic arm 604 rotates and/or pivots the nozzle assembly to remove it from the selected ink container 602, moves along the track 620 to the selected ink fountain 202, and rotates and/or pivots the nozzle assembly to place it in the selected ink fountain 202. FIG. 7C shows the robotic arm 604 with the nozzle assembly placed in the selected ink fountain 202. From this position, the nozzle assembly is operated to place the ink stored in its reservoir into the selected ink fountain 202. After placing the ink in the selected ink fountain 202, the nozzle assembly may be rotated and/or pivoted to remove it from the selected ink fountain 202. The robotic arm 604 is then in the transitional state until it is controlled to pick up from an ink container 602 or ink fountain 202.

While FIGS. 7A-C illustrate an operation of picking up ink from a selected ink container 602 and placing it in a selected ink fountain 202, it will be appreciated that the robotic arm 604 is structured to pick up ink from any ink container 602 and place it in any ink fountain 202. In some example embodiments, the robotic arm 604 is also structured to pick up ink from any ink fountain 202 and place it in any ink container 602.

Figure 8:
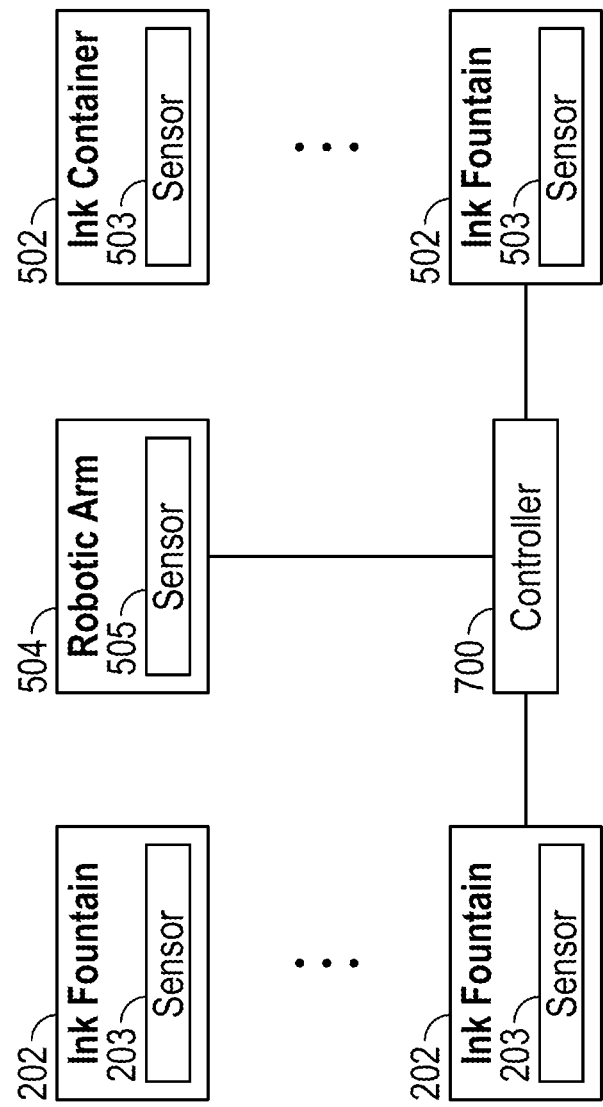
FIG. 8 is a schematic diagram of an ink replenishment system in accordance with an example embodiment of the disclosed concept.

FIG. 8 is a schematic diagram of an ink replenishment system in accordance with an example embodiment of the disclosed concept. While the schematic diagram of FIG. 8 is shown in conjunction with the robotic arm 504 and ink containers 502 of FIGS. 6A-C, it will be appreciated that it is also applicable to the robotic arm 604 and ink containers 602 of FIGS. 7A-C. In accordance with some example embodiments of the disclosed concept, the ink replenishment system further includes a controller 700 structured to control operations of the robotic arm 604. For example, the controller 700 may control movement of the robotic arm 604 and operation of its nozzle assembly.

In some example embodiments of the disclosed concept, the ink fountains 202 contain ink fountain sensors 203 structured to sense an amount of ink in the ink fountain 202. Similarly, the ink containers 502 may include ink container sensors 503 structured to sense an amount of ink in the ink container 502. Additionally, the robotic arm 504 may include a sensor 505 structured to sense an amount of ink in the reservoir of the nozzle assembly.

In some example embodiments, the controller 700 is structured to control the amount of ink picked up and placed by the robotic arm 504. The sensor 505 output may be used by the controller 700 to sense the amount of ink picked up or placed and control operation of the nozzle assembly to pick up or place the desired amount of ink. The precise amount of ink of each color required for decorating a run of cans is generally known or easily determined. In this manner, in a series of operations, the robotic arm 504 can be controlled via the controller 700 to pick up the precise amount of each color of ink required for a run of cans from the ink containers 502 and place the amount of each color of ink in its corresponding ink fountain 202. In this manner, at the end of the run of cans, there is little to no ink remaining in the ink fountains 202, which reduces the cleanup time when reconfiguring the can decorator for another run of cans.

In some example embodiments, the controller 700 may control the robotic arm 504 to replenish an ink fountain 202 with ink based on an output of the ink fountain sensor 203. For example, the controller 700 may control the robotic arm 504 to pick up ink from a corresponding ink container 502 and place it in the ink fountain 202 when the amount of ink in the ink fountain 202 falls below a threshold level.

In some example embodiments, the controller 700 may monitor amounts of ink in the ink containers 502 based on outputs of the ink container sensors 503. The controller 700 may control the robotic arm 504 to pick up ink from a selected ink container 502 based on the sensed amounts of ink. For example, when ink container 502 is empty, the controller 700 may move the robotic arm 504 to a different ink container 502 of the same color that still contains ink. In this manner, operation of the can decorator can continue.

While an example embodiment of a can decorator has been described herein, it will be appreciated that the disclosed concept may be employed with many types of can decorators such as, for example and without limitation, digital decorators. It will also be appreciated that the disclosed concept is not limited to can decorators and may be employed with other types of can making or other types of machinery. For example, rather than replenishing ink, example embodiments of robotic arms may be employed to replenish other types of fluids in other types of machinery.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An ink replenishment system for a can decorator having a plurality of ink fountains corresponding to a plurality of ink station assemblies, the ink replenishment system comprising:
    a robotic arm structured to move between the plurality of ink fountains and a plurality of ink containers, to pick up ink from one of the plurality of ink fountains or ink containers and to place the picked up ink in another one of the plurality of ink fountains or ink containers; and
    a controller structured to control operations of the robotic arm.

2. The ink replenishment system of claim 1, wherein the robotic arm comprises:
    a nozzle assembly including a nozzle and a reservoir, wherein the robotic arm is structured to pick up ink from one of the plurality of ink fountains or ink containers via the nozzle and store the picked up ink in the reservoir, and wherein the robotic arm is structured to place the picked up ink stored in the reservoir in another one of the plurality of ink fountains or ink containers via the nozzle.

3. The ink replenishment system of claim 2, wherein the robotic arm comprises:
    a base structured to rotate;
    a first arm having a first end pivotally attached to the base;
    a second arm having a first end pivotally attached to a second end of the first arm, and
    wherein the nozzle assembly is pivotally attached to a second end of the second arm.

4. The ink replenishment system of claim 3, wherein the robotic arm is structured to rotate and pivot to move from one of the plurality of ink fountains or ink containers to another one of the plurality of ink fountains or ink containers.

5. The ink replenishment system of claim 2, further comprising:
    a track disposed between the plurality of ink fountains and the plurality of ink containers,
    wherein the robotic arm is attached to the track and structured to move along the track, and wherein the nozzle assembly is structured rotate and/or pivot.

6. The ink replenishment system of claim 5, wherein the robotic arm is structured to move along the track from a first position proximate one of the plurality of ink fountains or ink containers to a second position proximate another one of the plurality of ink fountains or ink containers, and wherein the nozzle assembly is structured to rotate and/or pivot in the first position to pick up ink from the one of the plurality of ink fountains or ink containers and to rotate and/or pivot in the second position to place the picked up ink in the another one of the plurality of ink fountains or ink containers.

7. The ink replenishment system of claim 5, wherein the plurality of ink fountains are arranged in a arced shape, wherein the track has an arced shape corresponding to the arrangement of the plurality of ink fountains, and wherein the ink containers are arranged in an arced shape.

8. The ink replenishment system of claim 1, further comprising:
a sensor structured to sense an amount of ink picked up and placed by the robotic arm, and wherein the controller is structured to control the robotic arm to pick up and place a predetermined amount of ink.

9. The ink replenishment system of claim 8, wherein the predetermined amount of ink is based on an amount of ink required to decorate a run of cans.

10. The ink replenishment system of claim 1, wherein the can decorator includes a plurality of ink fountain sensors corresponding to the plurality of ink fountains and being structured to sense amounts of ink in the ink fountains, and wherein the controller is structured to control the robotic arm to pick up ink from one of the plurality of ink containers and place the picked up ink in one of the plurality of ink fountains based on sensed amounts of ink in the ink fountains.

11. The ink replenishment system of claim 1, wherein the controller is structured to control the robotic arm to pick up ink from one of the plurality of ink containers and to place the picked up ink in one of the plurality of ink fountains.

12. The ink replenishment system of claim 1, wherein the controller is structured to control the robotic arm to pick up ink from one of the plurality of ink fountains and to place the picked up ink in one of the plurality of ink containers.

13. A method for replenishing ink in a can decorator having a plurality of ink fountains corresponding to a plurality of ink station assemblies, the method comprising:
controlling a robotic arm to pick up ink from one of the plurality of ink fountains or one of a plurality of ink containers, wherein the robotic arm structured to move between the plurality of ink fountains ink containers;
controlling the robotic arm to move to another one of the plurality of ink fountains or ink containers; and
controlling the robotic arm to place the picked up ink in the another one of the plurality of ink fountains or ink containers.

14. The method of claim 13, further comprising:
sensing an amount of ink picked up and placed by the robotic arm; and
controlling the robotic arm to pick up and place a predetermined amount of ink.

15. The method of claim 14, wherein the predetermined amount of ink is based on an amount of ink required to decorate a run of cans.

16. The method of claim 13, further comprising:
sensing an amount of ink in the ink fountains; and
controlling the robotic arm to pick up ink from one of the plurality of ink containers and place the picked up ink in one of the plurality of ink fountains based on sensed amounts of ink in the ink fountains.

17. The method of claim 13, further comprising:
controlling the robotic arm to pick up ink from one of the plurality of ink containers;
controlling the robotic arm to move to one of the plurality of ink fountains; and
controlling the robotic arm to place the picked up ink in the one of the plurality of ink fountains.

18. The method of claim 13, further comprising:
controlling the robotic arm to pick up ink from one of the plurality of ink fountains;
controlling the robotic arm to move to one of the plurality of ink containers; and
controlling the robotic arm to place the picked up ink in the one of the plurality of ink containers.

19. A can decorator system comprising:
a plurality of ink fountains corresponding to a plurality of ink station assemblies;
a plurality of ink containers;
a robotic arm structured to move between the plurality of ink fountains and the plurality of ink containers, to pick up ink from one of the plurality of ink fountains or ink containers and to place the picked up ink in another one of the plurality of ink fountains or ink containers; and
a controller structured to control operations of the robotic arm.

20. The can decorator of claim 19, further comprising:
a sensor structured to sense an amount of ink picked up and placed by the robotic arm, wherein the controller is structured to control the robotic arm to pick up and place a predetermined amount of ink, and wherein the predetermined amount of ink is based on an amount of ink required to decorate a run of cans.

* * * * *